United States Patent [19]
Driscoll

[11] 3,869,971
[45] Mar. 11, 1975

[54] APPARATUS FOR PREPARING FOLDED FOOD CHIPS

[75] Inventor: Robert R. Driscoll, Buena Park, Calif.

[73] Assignee: Pet Incorporated, St. Louis, Mo.

[22] Filed: May 10, 1972

[21] Appl. No.: 252,007

[52] U.S. Cl. ............... 99/353, 99/404, 99/407, 99/443 C
[51] Int. Cl. ........................................ A47j 37/12
[58] Field of Search .............. 99/353, 349, 352–353, 99/355, 404, 405, 406–427, 443; 425/223, 425/432, 436–437; 198/180; 249/66 A; 100/93 RP

[56] References Cited
UNITED STATES PATENTS

| | | | |
|---|---|---|---|
| 2,234,153 | 3/1941 | Herbert | 100/93 RP X |
| 2,598,866 | 6/1952 | Warp | 425/437 X |
| 2,714,451 | 8/1955 | Gammeter | 249/66 A X |
| 3,520,248 | 7/1970 | MacKendrick | 99/404 X |
| 3,528,362 | 9/1970 | Arnold | 99/443 C X |
| 3,680,474 | 8/1972 | Brown | 99/427 X |
| 3,690,895 | 9/1972 | Amadon et al. | 99/404 X |
| 3,763,764 | 10/1973 | Schy | 99/404 X |

Primary Examiner—Peter Feldman
Assistant Examiner—Arthur O. Henderson
Attorney, Agent, or Firm—Gravely, Lieder & Woodruff

[57] ABSTRACT

An apparatus for preparing folded food chips includes means for sheeting dough and for cutting successive disk-shaped segments from the sheeted dough. These segments are deposited on the upper pass of a conveyor chain such that the chain generally bisects the segments. Consequently, the sides of the segments drape downwardly and the segments assume a folded configuration. The sheeted dough remaining after the disk-shaped segments have been deposited drops to the sides of the chain and is returned to be again sheeted and cut. The upper pass of the chain rides on guide plates which prevent the dough segments from curling beneath the chain. The chain extends into an oven and by the time the folded segments reach the discharge end of the conveyor chain enough moisture has been removed from the folded segments to enable them to remain in the folded configuration without support from the chain. An air jet issuing from a nozzle adjacent to the discharge end of the conveyor chain dislodges the folded segments from the upper pass of the chain, and the folded segments so dislodged fall onto accumulating conveyor means which is also disposed in the oven. While on the accumulating conveyor means the segments are turned over. The accumulating conveyor means deposits the folded segments onto cooling conveyor means where they are cooled, and the cooling conveyor means delivers the cooled segments to a fryer. The food chips emerge from the fryer.

17 Claims, 8 Drawing Figures

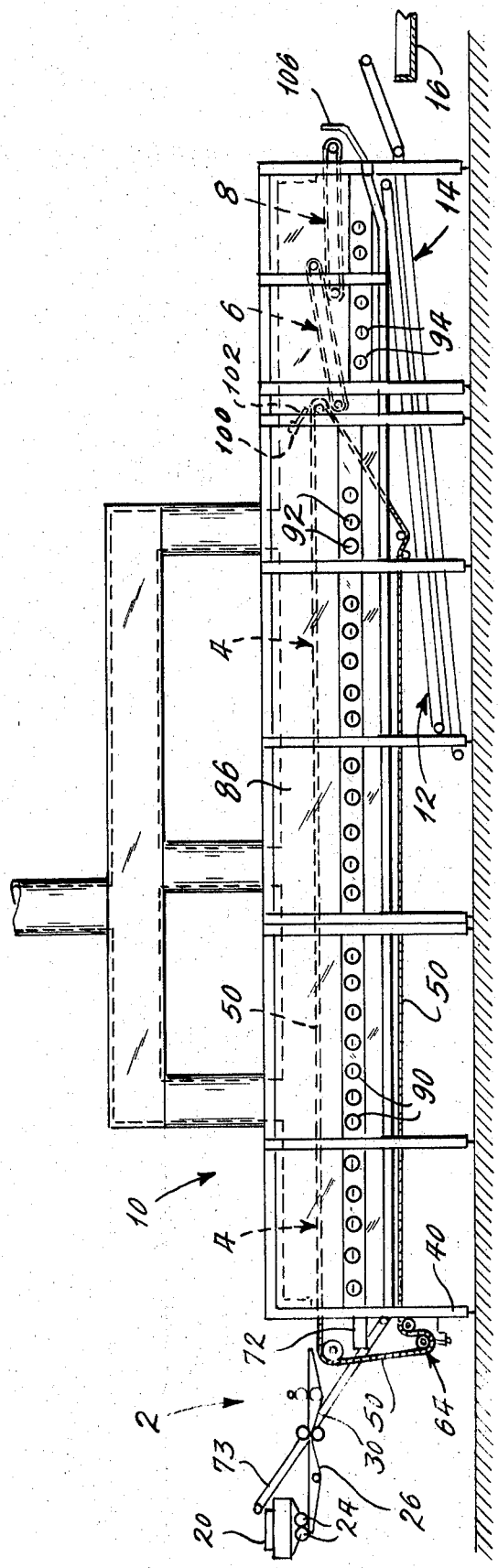

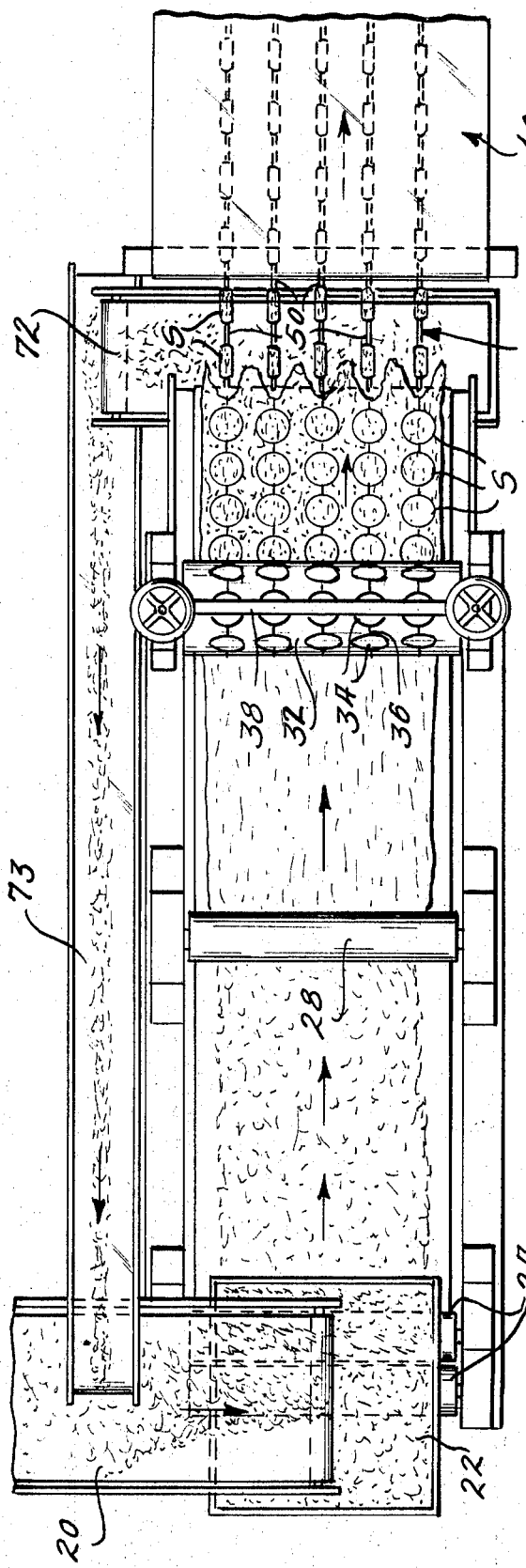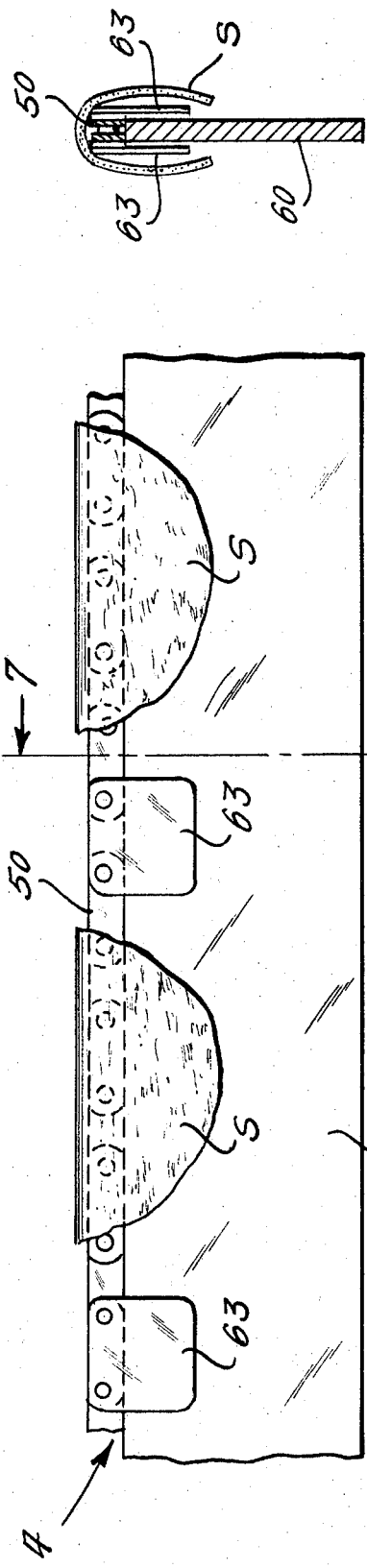

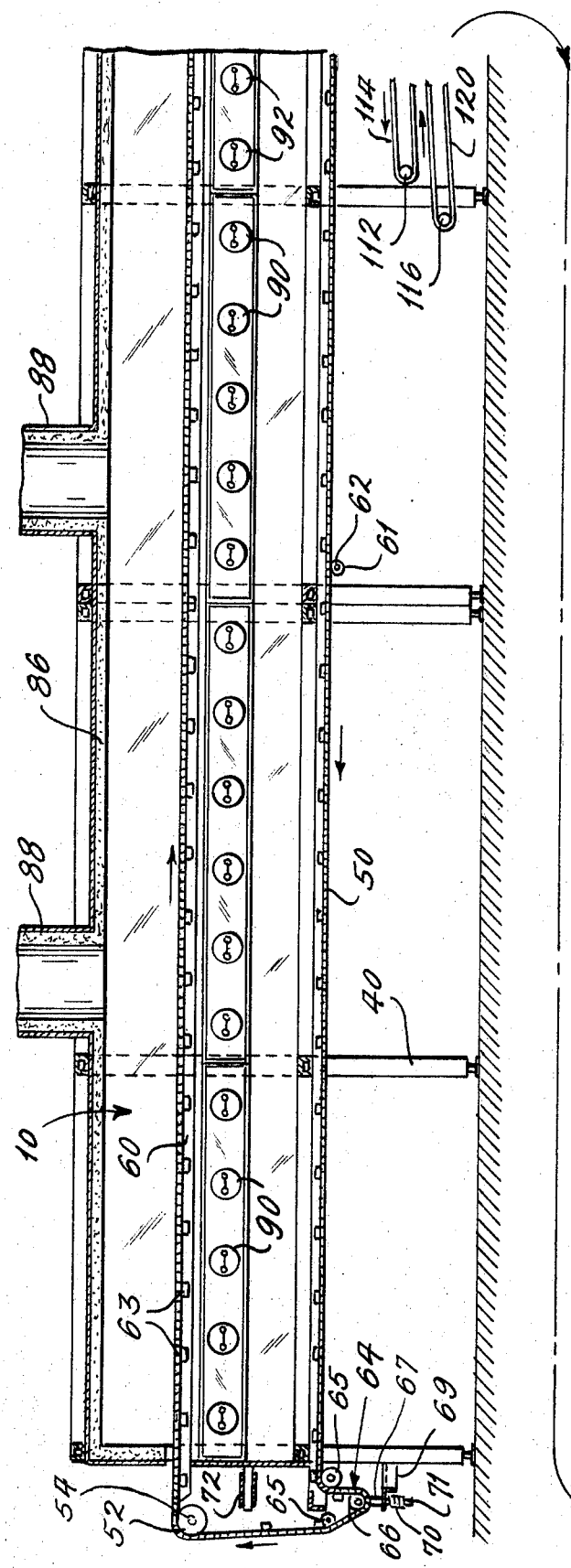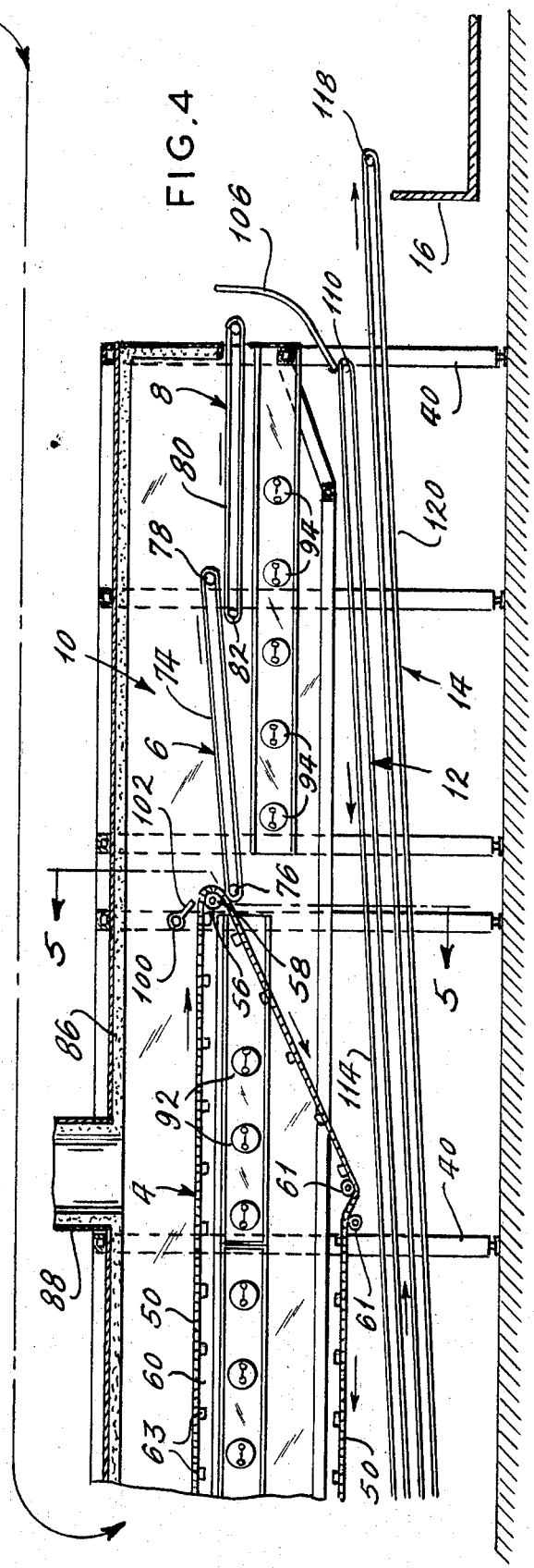
FIG. 4

APPARATUS FOR PREPARING FOLDED FOOD CHIPS

BACKGROUND OF THE INVENTION

This invention relates to an apparatus for preparing foods and more particularly to an apparatus for preparing folded food chips.

Conventional chip making machinery is suitable for producing chips having a wavy configuration, but not chips having a U-shaped configuration. The latter chips resemble miniature tacos, and this unique appearance promotes the sale of the chip product. The U-shaped configuration of the chips also renders them more suitable for packaging and less susceptible to crumbling.

SUMMARY OF THE INVENTION

One of the principal objects of the present invention is to provide an apparatus for producing taco-shaped food chips on a continuous mass production basis. Another object is to provide an apparatus of the type which is simple in construction and highly dependable. A further object is to provide an apparatus of the type stated which is highly compact.

The present invention is embodied in an apparatus which forms folded food chips by depositing disk-shaped dough segments on a shaping conveyor such that the segments drape downwardly across the sides of the conveyor and assume a folded configuration. The dough segments are heated while on the conveyor. The apparatus may include means for preventing the dough segments from curling under the shaping conveyor. It also may include means for directing an air jet toward discharge end of the shaping conveyor for dislodging the folded segments therefrom.

DESCRIPTION OF THE DRAWINGS

In the accompanying drawings which form part of the specification and wherein like numerals and letters refer to like parts wherever they occur:

FIG. 1 is a side elevational view of a chip making apparatus constructed in accordance with and embodying the present invention;

FIG. 2 is a sectional view of a sheeter and cutter forming a part of the invention;

FIG. 3 is a plan view of the sheeter and cutter;

FIG. 4 is a sectional view taken through the oven and showing the shaping conveyor, the accumulating conveyors, and the cooling conveyors;

FIG. 6 is a fragmentary elevational view of the chain and its guide plate, both of which form part of the shaping conveyor;

FIG. 7 is a sectional view taken along line 7—7 of FIG. 6; and

DETAILED DESCRIPTION

Figure 8:
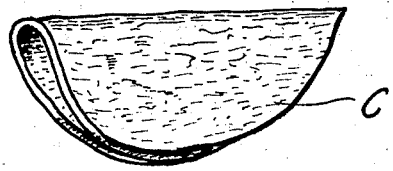
FIG. 8 is a perspective view of a food chip made with the apparatus.

Referring now to the drawings, A designates an apparatus for preparing folded food chips C (FIG. 8) from masa or some other suitable dough. Broadly speaking, the apparatus A includes (FIG. 1) a sheeter and cutter 2 which sheets the masa and cuts it into circular or disk-shaped segments S (FIG. 2). The sheeter and cutter 2 deposits the segments S on a shaping conveyor 4 where the segments S drape downwardly from their line of support and assume a folded or inverted U-shaped configuration. The shaping conveyor 4 discharges the folded dough segments S onto an accumulating conveyor 6 which in turn deposits the folded segments on another accumulating conveyor 8, the folded segments S being turned over during the transfer. Both the shaping conveyor 4 and the two accumulating conveyor 6 and 8 pass through an oven 10 where the dough segments S are heated and dried to the extent that they possess a chip-like consistency, that is they are not flexible as is the dough at the sheeter and cutter 2. The last accumulating conveyor 8 deposits the folded and dried dough segments S onto a cooling conveyor 12 which in turn transfers the segments S to another cooling conveyor 14. Both cooling conveyors 12 and 14 are disposed beneath the oven 10 so that the apparatus A occupies a minimum amount of floor space. The latter cooling conveyor 14 discharges the folded and dried segments S into a fryer 16 which is essentially a vat of cooking oil. The folded and dried segments S emerge from the fryer 16 as the folded food chips C (FIG. 8).

The sheeter and cutter 2 includes (FIGS. 2 and 3) a feed conveyor 20 which receives fresh ground masa from a stone mill (not shown) and delivers that masa to a hopper 22. The hopper 22 in turn directs the masa between a set of preliminary rolls 24 which sheet it to a thickness of approximately ¼ inch. The 1/4 inch sheet emerging from the preliminary rolls 24 passes onto a transfer conveyor 26 which directs it between a set of finish rolls 28, and these finish rolls reduce the thickness of the sheet to between 0.030 and 0.032 inches. The upper finish roll 28 rotates twice as fast as the lower roll 28 so that the sheet tends to follow the upper roll 28 and hence is lifted upwardly to be deposited on a cutting conveyor 30 which extends all the way to the shaping conveyor 4. The cutting conveyor 30 passes beneath a cutting roll 32 provided with axially spaced sets of circular cutters or molds 34 (FIG. 3) arranged about its periphery. The molds 34 of each set align circumferentially and are connected by circumferentially extending cutting edges 36. The circular molds 34 cut the circular dough segments S from the sheeted masa, while the circumferentially extending cutting edges 36 slit the sheet between successive segments S and thereby cooperate with the cutters 34 to divide the remaining portions of the sheeted masa into ribbons of masa scrap. Disposed above the cutting roll 32 is an air pipe 38 having nozzles aligned with and directed toward the sets of circular cutters 34. The air pipe 38 is supplied with compressed air at about 20 psig, and the air jets issuing from the nozzles clean out the cutting molds 34, preventing any build up of masa therein.

The shaping conveyor 4, the two accumulating conveyors 6 and 8, and the two cooling conveyors 12 and 14 are supported on a framework 40 which is disposed between the sheeter and cutter 2 and the fryer 16. The framework 40 also supports the oven 10 which is in effect built around the shaping conveyor 4 and the two accumulating conveyors 6 and 8.

The shaping conveyor 4 includes (FIG. 4) a plurality of roller-type chains 50 which are positioned side-by-side, yet spaced apart, within the confines of the framework 40. Each chain 50 aligns with different circumferential row of molds 34 on the cutting roll 32. The receiving end of the shaping conveyor 4 is disposed beyond the end of the oven 10, and at this location the individual chains 50 are trained over sprockets 52 mounted on a common drive shaft 54 which is journaled in bearings supported by the framework 40. The sprockets 52 are disposed immediately beyond and slightly lower than the discharge end of the cutting conveyor 30 (FIG. 2) so that the disk-shaped dough segments S pass onto the chains 50 at the terminal end of the cutting conveyor 30. The terminal end of the shaping conveyor 4 is located within the oven 10 and at this point the individual chains 50 are trained over sprockets 56 on a shaft 58 which is also journaled in bearings supported on the framework 40. Between the two sprockets 52 and 56 are the upper or conveying passes of the individual chains 50, and each chain 50 is supported by and rides on a guide plate 60 which is in effect a generally planar member having a thickness approximately the same as that of the chain 50. The guide plates 60 are oriented such that their planar surfaces are disposed vertically, and those surfaces prevent the sides of the circular dough segments S from curling underneath the chains 50 as the dough segments S are advanced through the oven 10 on the chains 50. The lower or return passes of the individual chains 50 are supported on and guided by idler rollers 61 which are carried by idler shafts 62 journaled in bearings supported by the framework 40.

At equally spaced intervals each chain 50 is provided with extended guide links 63 (FIGS. 6 and 7) the extensions of which are arranged in pairs and project inwardly into the area circumscribed by the chain 50. The extensions of each guide link 63 are furthermore spaced apart a distance slightly greater than the thickness of the guide plate 60 and the thickness of the sprockets 52 and 56. Thus, the guide links 63 pass along side the sprockets 52 and 56 and the plate 60 without interferring with them. Since the guide links 63 pass along the side of the plate 60, they prevent the chain 50 from sliding laterally off the plate 60. Preferably the pairs of guide links 63 are spaced at 6 inch intervals along the chain 50.

At the receiving end of the shaping conveyor 4, each chain 50 thereof extends through a tensioning mechanism 64 (FIG. 4) which maintains substantially constant tension in the chain 50 irrespective of the temperature of the oven 10. Each tensioning mechanism 64 includes a pair of guide rollers 65 around which the return pass of the chain 50 is extended. One of the rollers 65 is located below the corresponding sprocket 52 while the other is set somewhat inwardly toward the oven 10. Between the two guide rollers 65 the return pass of the chain 50 is extended around a tensioning roller 66 which is carried by a yoke 67 having a threaded shank which extends through a bracket 69 on the framework 40. The shank of the yoke 67 also extends through a coil spring 70 compressed between the bracket 69 and a nut 71 threaded over the shank. The spring 70 urges the tensioning roller 66 downwardly to maintain a prescribed tension in the chain 50. This tension may be adjusted by changing the position of the nut 71 on the shank of the yoke 67.

The drive shaft 54 is connected to an electric motor (not shown) which rotates the same and the sprockets 52 thereon. The sprockets 52 in turn drive the chains 50. The speed of the motor is such that the circular segments S deposited on the chain 50 remain on it for about 29 seconds, that is the segments S take about 29 seconds to reach the other sprockets 56.

Extending between the upper and return passes of the chains 50 at the forward end of the framework 40, that is at the end adjacent to the sheeter and cutter 2, is a scrap collecting conveyor 72 (FIGS. 2 and 3) which collects the ribbons of dough scrap left after the dough segments S have been deposited from the chains 50. The scrap collecting conveyor 72 moves transversely with respect to the chains 50 and the cutting conveyor 30 and deposites the scrap collected thereon onto a return conveyor 73 which leads to the feed conveyor 20. Consequently, the dough scrap is returned to the hopper 22 where it is again sheeted and cut into circular dough segments S.

The accumulating conveyor 6 comprises (FIG. 4) a belt 74 trained around a pair of rollers 76 and 78. The roller 76 is disposed beneath the sprockets 56 at the terminal end of the shaping conveyor 4, so that when the folded chips S are dislodged from the chains 50 they fall onto the belt 74 and are carried away from the shaping conveyor 4.

The second accumulating conveyor 8 comprises (FIG. 4) a belt 80 which is trained around a pair of rollers 82 and 84. The roller 82 at the beginning of the belt conveyor 80 is disposed beneath the roller 78 at the terminal end of the accumulating conveyor 6 so as to receive the supply of folded dough segments S accumulated on the conveyor 6. As the folded dough segments fall from the discharge end of the accumulating conveyor 6 onto the receiving end of the accumulating conveyor 8 they turn over and thus receive uniform drying. The terminal end of the accumulating conveyor 8 is disposed slightly beyond the far end of the framework 40.

One of the rollers 76 and 78 of the conveyor 6 is connected to an electric motor (not shown) and likewise so is one of the rollers 82 and 84 of the conveyor 8. This motor drives the belts 74 and 80 at the same velocity and in the same direction. The velocity is less than that of the chain 50 and is such that the folded dough segments S remain on the two belts 74 and 80 a total of approximately 17 seconds.

The oven 10 (FIG. 4) for the most part encloses the shaping conveyor 4, the accumulating conveyor 6, and the accumulating conveyor 8. Indeed, only very short portions of the chains 50 project beyond the inlet to the oven 10 and it is these portions of the chains 50 onto which the circular dough segments S from the sheeter and cutter 2 are initially deposited. Likewise, only a very small portion of the accumulating conveyor 8 projects beyond the exit end of the oven 10. The oven 10 includes an insulated enclosure 86 positioned around the conveyors 4, 6 and 8 and having exhaust stacks 88 leading therefrom. Within the enclosure 86 the oven 10 is provided a first set of burners 90 which are located between the upper and lower passes of the chains 50 near the inlet to the oven 10. It is further provided with a second set of burners 92 which are also located between the upper and lower passes of the chains 50, but are disposed beyond the first set of burners 90. In addition to the first and second sets of burners 90 and 92, the oven 10 has a third set of burners 94 which are disposed beneath the accumulating conveyors 6 and 8. The burners of all of three sets 90, 92 and 94 extend transversely with respect to the oven 10, and are preferably fueled by a combustible gas such as natural gas. The sets of burners 90, 92 and 94 are arranged in succession and are controlled independently of one another to provide a triple zone temperature control. The first zone which is immediately beyond the inlet to the oven 10 is heated by the first set of burners 90, and this zone is maintained between 1000°F. and 1050°F. The second zone which is heated by the second set of burners 92 is maintained between 750° F. and 770°F. The third zone which is heated by the third set of burners 94 is maintained at 400°F. to 450°F.

Figure 5:
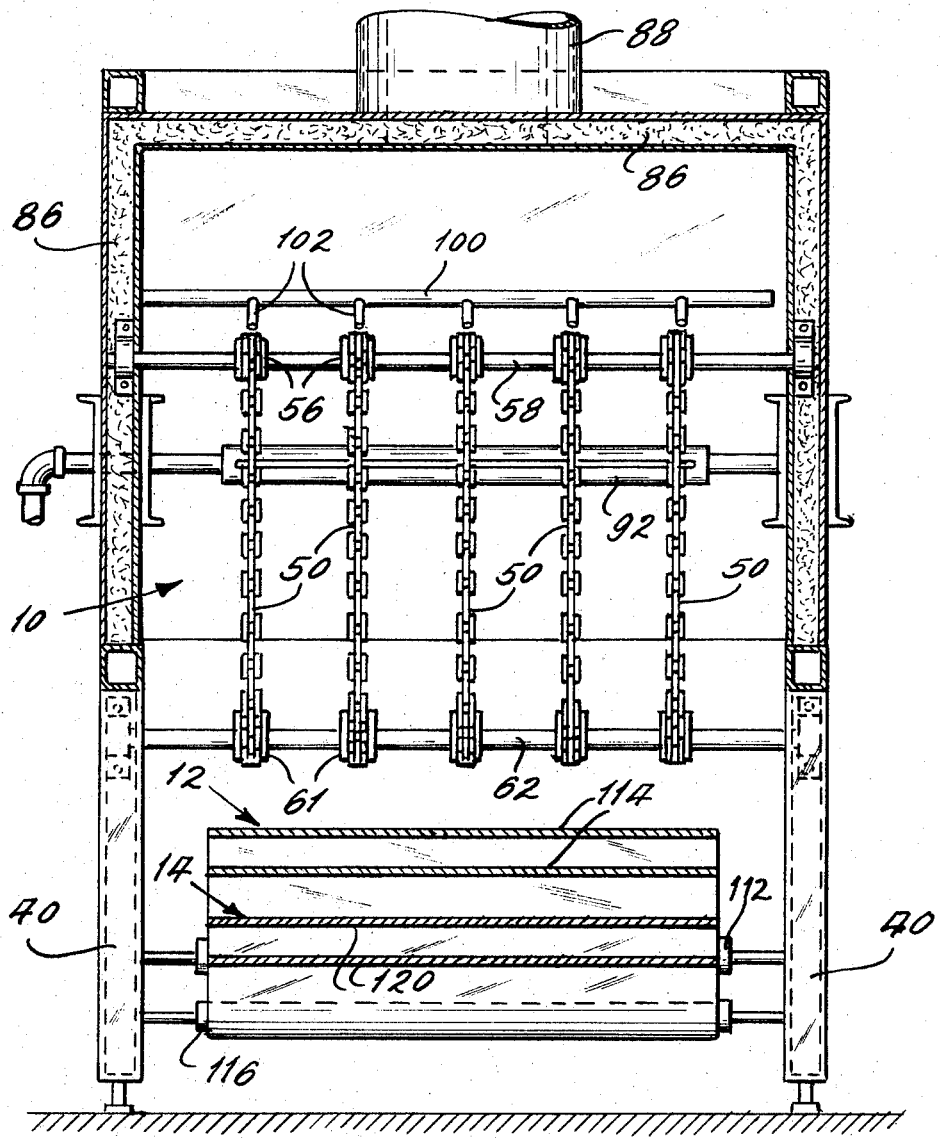
FIG. 5 is a sectional view taken along line 5—5 of FIG. 4.

Within the oven 10 at the discharge end of the shaping conveyor 4, an air pipe 100 (FIGS. 4 and 5) extends across the framework 40 and is provided with nozzles 102 which are directed at the portions of the chains 50 passing over the sprockets 56. In particular, the nozzles 102 are directed obliquely with respect to the upper passes of the chains 50 and generally in the direction of advance for the dough segments S. The nozzles 102 are further oriented such that the air jets issuing therefrom are generally tangent to those curved segments of the chains 50 passing over the sprockets 56. Thus, as the folded segments pass onto the sprockets 56, they tend to follow the chains 50 around the sprockets and this tips their trailing ends upwardly. The air discharged from the nozzles 102 will accordingly be directed against the undersides of the folds in the folded dough segments S, and the segments S will be blown off of the chains 50 and onto the accumulating conveyor 6 which moves them away from the end of the shaping conveyor 4. The pressure of the air within the pipe 100 is approximately 50 psig.

At the discharge end of the oven 10, the accumulating conveyor 8 passes over a chute 106 (FIG. 4) which leads to the first cooling conveyor 12. That cooling conveyor 12, while being supported on the framework 40, is nevertheless located beneath the enclosure 86 of the oven 10 and is therefore in a relatively cool zone. The first cooling conveyor 12 includes a roller 110 located immediately beneath the end of the chute 106 and another roller 112 is located under the midportion of the oven 10. In addition, the cooling conveyor 12 includes a belt 114 which is trained over the rollers 110 and 112. The discharge end of the cooling conveyor 12 is disposed above the receiving end of the other cooling conveyor 14, and that conveyor includes a pair of rollers 116 and 118 as well as a belt 120 which is trained around the rollers 116 and 118. The discharge end of the cooling conveyor 14, which is the end at which the roller 118 is disposed, is located immediately above the fryer 16.

The fryer 16 is conventional in construction and is in effect a vat of heated cooking oil.

OPERATION

Fresh ground masa is transferred from a stone mill to the hopper 22 by means of the feed conveyor 20. This masa is sheeted to a thickness of approximately one-fourth inch by the preliminary rollers 24 and is thereafter reduced to a thickness of 0.030 to 0.032 inches by the finish rollers 28. Upon leaving the rollers 28 the sheeted masa passes along the cutting conveyor 30 where the circular molds 34 on the cutting roll 32 are pressed into it. These molds 34 cut successive circular segments S into the sheeted masa and each segment is preferably about 2½ inches in diameter. Not only does the cutting roll 32 cut the circular segments S into the sheeted masa, but it further slits the masa between successive circular segments S, the latter operation being performed by the circumferentially extending cutting edges 36. Hence, that much of the sheeted masa which is located beyond the cutting roll 32 on the cutting conveyor 30 is in effect several rows of circular segments S separated by ribbons of scrap dough.

At the end of the cutting conveyor 30 the circular segments S drop onto the upper passes of the chains 50 forming part of the shaping conveyor 4. These segments S are supported along their mid-portions by the chains 50 but their sides drape downwardly across the sides of the chains 50 and against the outwardly presented faces of the guide plates 60 which, being substantially the same thickness as the chains 50, prevent the sides of the dough segments S from curling under the chains 50. On the other hand, the ribbons of scrap located between the circular dough segments S on the cutting conveyor 30 pass between the chains 50 and drop onto the scrap collecting conveyor 72 which transfers the scrap so collected to the return conveyor 73. The return conveyor 73 in turn delivers the scrap to the feed conveyor 20 so that it can be again sheeted and cut.

The disk-shaped dough segments S delivered to the chains 50 have a moisture content of approximately 48% and as they are advanced along the chains 50 they are heated and, of course, dried. Each dough segment S remains on the upper pass of the chain 50 for approximately 29 seconds and during that time it passes through the first temperature zone which is maintained at 1000°F. to 1050°F. by the set of burners 90 and the second temperature zone which is maintained between 750°F. to 770°F. by the set of burners 92. After 29 seconds, the dough segments S reach the sprockets 56 at the end of the shaping conveyor 4, and by this time they have lost enough moisture to maintain their folded configurations without support from the chains 50.

As the chains 50 pass over the sprockets 56 at the end of the shaping conveyor 4, the folded dough segments S thereon are dislodged from the chains 50 by air jets issuing from the nozzles 102. The dislodged dough segments S fall from the shaping conveyor 4 onto the accumulating conveyor 6, the belt 114 of which advances somewhat slower than the chains 50. The accumulating conveyor 6 deposites the folded segments S onto the other accumulating conveyor 8 and in so doing the folded dough segments S turn over so that they are dried uniformly. The dough segments S remain on the accumulating conveyors 6 and 8 a total of about 17 seconds, and hence remain on the third zone which is maintained between 400°F. and 450°F. by the third set of burners 94, for that period of time.

Upon leaving the accumulating conveyor 8 the folded dough segments S fall onto the chute 106 which diverts them to the first cooling conveyor 12. That conveyor 12 delivers the dough segments S to the other cooling conveyor 14 which in turn discharges the dough segments S into the fryer 16. The folded dough segments S remain on the two cooling conveyors 12 and 14 for a total of 90 seconds, and as they are discharged into the fryer 16 their moisture content is about 28%.

The temperature of the cooking oil within the fryer 16 is about 390°F. to 400°F. and the dough segments S remain in the fryer 16 for about 27 seconds. Upon being withdrawn from the fryer 16 the dough segments S are salted and cooled and thus become the folded food chips C.

What is claimed is:

1. An apparatus for preparing folded food chips from dough, said apparatus comprising: means for forming the dough into disk-shaped segments, an endless shaping conveyor having a conveying pass which is narrower than the disk-shaped segments and on which the disk-shaped segments are deposited and supported with the conveying pass generally bisecting the segments, whereby the sides of the disk-shaped segments drape downwardly and the segments assume a folded configuration; means disposed beneath the conveying pass of the shaping conveyor for preventing the sides of the folded segments from curling under the conveying pass; and means for heating the folded segments when they are on the shaping conveyor to remove moisture therefrom.

2. An apparatus according to claim 1 wherein the means for heating the folded segments removes enough moisture from the segments while the segments are on the shaping conveyor to enable the segments to maintain their folded configuration after leaving the shaping conveyor.

3. An apparatus according to claim 2 wherein the means for preventing the folded segments from curling under the conveying pass is a guide plate disposed beneath the conveying pass and having generally flat side faces which are oriented in a vertical disposition.

4. An apparatus according to claim 3 wherein the conveying pass rides on and is supported by the guide plate.

5. An apparatus according to claim 2 and further characterized by accumulating conveyor means located beyond the shaping conveyor and receiving the folded chips therefrom.

6. An apparatus according to claim 5 and further characterized by air nozzles positioned adjacent to the discharge ends of the shaping conveyor for directing a stream of high velocity air toward the shaping conveyor to dislodge the folded segments therefrom.

7. An apparatus according to claim 6 wherein the means for heating the segments also heats the segments while they are on the accumulating conveyor means.

8. An apparatus according to claim 5 and further characterized by cooling conveyor means located beyond the accumulating conveyor means for receiving the folded segments discharged from the accumulating conveyor means, the cooling conveyor means being outside the means for heating the golded segments so that the temperature of the folded segments decreases while on the cooling conveyor means.

9. An apparatus according to claim 8 wherein the accumulating conveyor means comprises a pair of belt-type endless conveyors with one being located after the other, the discharge end of the first conveyor being located above the receiving end of the second conveyor so that the folded segments turn over as they are transferred from the first conveyor to the second conveyor.

10. An apparatus according to claim 2 wherein a plurality of side-by-side conveying passes are provided on the shaping conveyor with spaces between adjacent conveying passes; wherein the means for forming the dough into disk-shaped segments comprises roller means for sheeting the dough, means for advancing the sheeted dough toward the receiving end of the shaping conveyor, cutter means for cutting successive disk-shaped segments from the sheet as the sheet is advanced with the disk-shaped segments so cut aligning with the several conveying passes of the shaping conveyor, and means for cutting the sheeted dough between successive disk-shaped segments so as to form the scrap portion of dough between the disk-shaped segments into ribbons; and wherein collecting means is located beneath the conveying passes of the shaping conveyor for collecting the ribbons of scrap dough.

11. An apparatus according to claim 10 wherein the collecting means further includes means for returning the scrap dough to the roller means so that the scrap dough can again be sheeted.

12. An apparatus according to claim 4 wherein the endless shaping conveyor is a chain having guide links which extend inwardly into the area circumscribed by the chain and further extend along the sides of the guide plate to prevent the folded segments from sliding off of the guide plate.

13. An apparatus for preparing folded food chips, said apparatus comprising: means for forming dough into disk-shaped segments; a shaping conveyor including a wheel which rotates about a horizontal axes and an endless conveying element which is trained around the wheel and has an upper conveying pass and a lower return pass, the conveying element being substantially narrower than the disk-shaped segments and the end of the conveying pass being at the wheel; means for depositing the disk-shaped segments on the conveying pass at the beginning thereof with the conveying pass generally bisecting the segments, whereby the segments drape downwardly on both sides of the conveying pass and assume a generally folded configuration; heating means for heating the folded segments sufficiently to enable them to maintain their folded configuration after leaving the conveying pass; and a nozzle located adjacent to the wheel and connected to a source of pressurized air so that a jet of high velocity air is discharged therefrom, the nozzle being oriented such that the jet of high velocity air moves generally in the direction of movement for the conveying pass at the wheel, whereby the jet of air will dislodge the folded segments from the conveying pass at the end of the conveying pass.

14. An apparatus according to claim 13 wherein the nozzle is positioned above the conveying pass and is oriented such that the jet issuing therefrom is oblique to the conveying pass.

15. An apparatus according to claim 14 and further characterized by an accumulating conveyor located beyond the shaping conveyor for receiving the segments dislodged from shaping conveyor.

16. An apparatus according to claim 14 wherein the shaping conveyor further includes a return pass; wherein the conveying and return passes merge at an arcuate section extended around the wheel; and wherein the jet issuing from the nozzle is generally tangent to the arcuate section.

17. An apparatus according to claim 13 wherein the nozzle is located above the conveying pass and the jet of air issuing from the nozzle is generally tangent to the portion of the endless conveying element where that portion is trained around the wheel.

* * * * *